US012581447B2

(12) United States Patent
Chen et al.

(10) Patent No.: US 12,581,447 B2
(45) Date of Patent: Mar. 17, 2026

(54) COMMUNICATION METHOD AND APPARATUS

(71) Applicant: Huawei Technologies Co., Ltd., Shenzhen (CN)

(72) Inventors: Gong Chen, Shanghai (CN); Vishnu Preman, Lund (SE); Linping Yang, Shanghai (CN); Xibo Sun, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 310 days.

(21) Appl. No.: 18/446,988

(22) Filed: Aug. 9, 2023

(65) Prior Publication Data

US 2023/0388957 A1      Nov. 30, 2023

Related U.S. Application Data

(63) Continuation of application No. PCT/CN2022/075637, filed on Feb. 9, 2022.

(30) Foreign Application Priority Data

Feb. 10, 2021    (CN) .......................... 202110184233.1

(51) Int. Cl.
*H04W 60/04* (2009.01)
*H04W 8/02* (2009.01)

(52) U.S. Cl.
CPC ............. *H04W 60/04* (2013.01); *H04W 8/02* (2013.01)

(58) Field of Classification Search
CPC ......... H04W 60/04; H04W 8/02; H04W 4/90; H04W 60/00; H04W 48/08; H04W 48/16
See application file for complete search history.

(56) References Cited

U.S. PATENT DOCUMENTS

| | | | | |
|---|---|---|---|---|
| 6,157,633 A * | 12/2000 | Wright | ................. | H04W 48/16 |
| | | | | 370/349 |
| 10,880,802 B1 | 12/2020 | Bakker | | |
| 2003/0050040 A1 * | 3/2003 | Yamazaki | ........... | G08B 25/016 |
| | | | | 455/566 |

(Continued)

FOREIGN PATENT DOCUMENTS

| | | |
|---|---|---|
| JP | 2006518122 A | 8/2006 |
| JP | 2020039079 A | 3/2020 |

(Continued)

OTHER PUBLICATIONS

3GPP TSG CT WG1 Meeting #127bis-e, C1-210259, "Discussion on solutions Key issues for MINT #3, #4, #5,#7,#8", Huawei, HiSilicon, Electronic meeting, Jan. 25-29, 2021, total 5 pages.

(Continued)

*Primary Examiner* — Benjamin M Thieu
(74) *Attorney, Agent, or Firm* — Slater Matsil, LLP

(57) ABSTRACT

This application discloses a communication method and apparatus. The method includes: A UE sends a registration request message to an AMF, where the registration request message includes indication information, and the indication information indicates whether a disaster scenario exists. The AMF receives the registration request message, and sends a registration response message to the UE based on the indication information and a load status. The UE receives the registration response message.

20 Claims, 5 Drawing Sheets

(56) References Cited

U.S. PATENT DOCUMENTS

| | | | | |
|---|---|---|---|---|
| 2003/0162557 A1* | 8/2003 | Shida | ...................... | H04M 3/42 |
| | | | | 455/521 |
| 2006/0079200 A1* | 4/2006 | Hirouchi | ............. | H04L 12/1895 |
| | | | | 455/404.1 |
| 2012/0190295 A1* | 7/2012 | Kim | ....................... | G06Q 50/26 |
| | | | | 455/3.01 |
| 2020/0374968 A1 | 11/2020 | Sun et al. | | |
| 2022/0264403 A1* | 8/2022 | Watfa | ................... | H04W 76/50 |

FOREIGN PATENT DOCUMENTS

| | | | |
|---|---|---|---|
| WO | 2020022401 A1 | 1/2020 | |
| WO | 2021007447 A1 | 1/2021 | |
| WO | 2021015597 A1 | 1/2021 | |

OTHER PUBLICATIONS

3GPP TS 22.261 V18.1.1 (Jan. 2021), 3rd Generation Partnership Project; Technical Specification Group Services and System Aspects; Service requirements for the 5G system; Stage 1 (Release 18), total 85 pages.

3GPP TR 22.831 V17.1.0 (Dec. 2019), 3rd Generation Partnership Project; Technical Specification Group Services and System Aspects; Study on Support for Minimization of Service Interruption (Release 17), total 19 pages.

3GPP TS 24.501 V17.1.0 (Dec. 2020), 3rd Generation Partnership Project; Technical Specification Group Core Network and Terminals; Non-Access-Stratum (NAS) protocol for 5G System (5GS); Stage 3; (Release 17), total 746 pages.

3GPP TR 24.811 V0.1.0 (Dec. 2020), 3rd Generation Partnership Project; Technical Specification Group Core Network and Terminals; Study on the support for minimization of service interruption; (Release 17), total 14 pages.

3GPP TS 38.331 V15.12.0 (Dec. 2020), 3rd Generation Partnership Project; Technical Specification Group Radio Access Network; NR; Radio Resource Control (RRC) protocol specification (Release 15), total 537 pages.

3GPP TSG-CT WG1 Meeting #127bis-e, C1-210151, "Solution for KI#4", Huawei, HiSilicon, Electronic meeting; Jan. 25-29, 2021, total 2 pages.

3GPP TSG-CT WG1 Meeting #127bis-e, C1-210116, Solution to MINT Key Issue #7 (Prevention of signalling overload in PLMNs without Disaster Condition) Alternative 1: providing disaster roaming assistance information to distribute roamers, and congestion mitigation, Qualcomm Incorporated, Electronic meeting; Jan. 25-29, 2021, total 5 pages.

3GPP TSG-CT WG1 Meeting #127bis-e, C1-210426, Solution for KI#4, Huawei, HiSilicon, Electronic meeting; Jan. 25-29, 2021, total 2 pages.

* cited by examiner

COMMUNICATION METHOD AND APPARATUS

CROSS-REFERENCE TO RELATED APPLICATIONS

This application is a continuation of International Application No. PCT/CN2022/075637, filed on Feb. 9, 2022, which claims priority to Chinese Patent Application No. 202110184233.1, filed on Feb. 10, 2021. The disclosures of the aforementioned applications are hereby incorporated by reference in their entireties.

TECHNICAL FIELD

This application relates to the field of communication technologies, and in particular, to a communication method and an apparatus.

BACKGROUND

In a mobile communication system, when a terminal device needs to access a network, the terminal device sends a registration request message to a related network element such as an access and mobility management function (access and mobility management function, AMF), so that the AMF obtains the registration request message, and then determines whether a UE is allowed to access a related network, for example, a network corresponding to the AMF.

It may be learned that, how to explicitly indicate related information by using the registration request message needs to be urgently resolved.

SUMMARY

This application provides a communication method and apparatus, to effectively indicate, by using indication information, whether a disaster scenario exists, thereby improving efficiency of information exchange.

According to a first aspect, an embodiment of this application provides a communication method. The method includes:

A terminal device sends a registration request message to an access and mobility management function (AMF) (which may also be referred to as an access and mobility management network element or the like), where the registration request message includes indication information, and the indication information indicates whether a disaster scenario exists. The UE receives a registration response message from the AMF.

In this embodiment of this application, that the indication information indicates whether a disaster scenario exists may be understood as that the indication information indicates whether the terminal device (for example, the terminal device may be referred to as a UE for short) is in the disaster scenario. Generally, in the disaster scenario, a home public land mobile network (HPLMN) corresponding to the UE is usually damaged, and therefore the UE cannot effectively access the HPLMN. In this case, to avoid service interruption, the UE needs to roam to another network, such as a roaming PLMN. Therefore, the UE needs to interact with the AMF to ensure that the UE can access the roaming PLMN.

According to the method provided in this embodiment of this application, the registration request message includes the indication information. On the one hand, the AMF explicitly learns whether the UE is in the disaster scenario, thereby improving efficiency of information exchange. On the other hand, the AMF may further learn the reason why the UE accesses the roaming network (for example, a roaming PLMN or a network corresponding to the AMF). In addition, if the registration request message does not include the indication information, the AMF may not distinguish whether the registration request message is a registration request message sent by a local user or the registration request message sent by the UE in the disaster scenario, which probably affects a subsequent registration process of the AMF.

In a possible implementation, the indication information is a first value, and the indication information indicates that the terminal device is in the disaster scenario; or the indication information is a second value, and the indication information indicates that the terminal device is not in the disaster scenario.

For example, the first value may be 1, and the second value may be 0.

According to the method provided in this embodiment of this application, through 1-bit information, the AMF can learn whether the UE is in the disaster scenario, and can effectively support a registration process of the UE regardless of whether the UE is in or not in the disaster scenario.

In a possible implementation, the registration request message further includes a registration type, and the registration type includes: any one of initial registration, mobility registration (mobility registration updating), periodic registration (periodic registration updating), or emergency registration.

According to a second aspect, an embodiment of this application provides a communication method. The method includes:

An AMF receives a registration request message from a terminal device, where the registration request message includes indication information, and the indication information indicates whether a disaster scenario exists. The AMF sends a registration response message to the terminal device based on the indication information and a load status.

In this embodiment of this application, the registration request message includes the indication information, so that the AMF can send the registration response message to the UE based on the indication information and the load status of the AMF. Therefore, the AMF may perform different processing on the UE based on an actual scenario in which the UE is located. For example, the AMF may send a registration accept message or a registration reject message to the UE based on the scenario in which the UE is located.

In a possible implementation, that the AMF sends a registration response message to the terminal device based on the indication information and a load status includes: The AMF sends a threshold based on the indication information. The AMF sends a registration accept message or a registration reject message to the UE based on the load status and the threshold.

In this embodiment of this application, the load status may include a load status of the AMF or a load status of a network corresponding to the AMF.

In a possible implementation, when the indication information indicates that the disaster scenario exists, the threshold is a first threshold; or when the indication information indicates that the disaster scenario does not exist, the threshold is a second threshold.

In this embodiment of this application, the AMF may determine different thresholds based on whether the UE is in the disaster scenario. Therefore, the AMF sends the registration accept message or the registration reject message to the UE based on the load status of the AMF, so that the AMF may use different control methods on the UE based on the scenario in which the UE is located.

According to a third aspect, an embodiment of this application provides a communication method. The method includes:

A terminal device receives a system message from a base station in a roaming network, where the system message includes a maximum waiting duration. The terminal device determines, based on a value of an identifier of the terminal device mod the maximum waiting duration, a waiting duration for sending a registration request message. The terminal device sends the registration request message to an AMF after the waiting duration expires.

In this embodiment of this application, the maximum waiting duration is used to determine a waiting duration for the UE to send the registration request message. For example, the maximum waiting duration may also be understood as a maximum duration the UE waits. For example, the maximum waiting duration may also be referred to as a maximum network access waiting duration (inbound-waiting-max-time), a disaster roaming waiting range, a maximum roaming waiting duration, or the like. The specific name of the maximum waiting duration is not limited in this embodiment of this application.

According to the method provided in this embodiment of this application, the waiting duration is determined by using the value of the identifier of the UE mod the maximum waiting duration, so that a case in which a large quantity of UEs simultaneously access the network corresponding to the AMF can be alleviated, thereby ensuring access randomness of the UEs while minimizing a calculation amount.

In a possible implementation, that the terminal device sends the registration request message to an AMF includes:

If the terminal device determines that a disaster scenario exists, the terminal device sends the registration request message to the AMF.

In a possible implementation, the registration request message includes indication information, and the indication information indicates that the disaster scenario exists.

According to the method provided in this embodiment of this application, based on both the indication information and the waiting duration, network congestion as a result of a large quantity of UEs in the disaster scenario simultaneously accessing the network is avoided as much as possible.

According to a fourth aspect, an embodiment of this application provides a communication method. The method includes:

A base station in a roaming network determines a maximum waiting duration based on a load status.

The base station sends a system message to a terminal device, where the system message includes the maximum waiting duration.

According to the method provided in this embodiment of this application, when the UEs need to access the roaming network, the base station in the roaming network determines the maximum waiting duration based on the load status, so that time points of accessing the roaming network by the UEs can be effectively balanced, thereby alleviating a case in which a large quantity of UEs access the roaming network.

According to a fifth aspect, an embodiment of this application provides a communication method. The method includes:

A terminal device sends a registration request message to an access and mobility management network element AMF, and receiving a registration reject message from the AMF. The terminal device determines a list based on the registration reject message, where the list includes a network that is corresponding to the AMF and that is not allowed to be accessed in a disaster scenario.

According to the method provided in this embodiment of this application, through the list, the UE may add the network corresponding to the AMF to the list after receiving the registration reject message from the AMF. In this way, a case in which the UE repeatedly accesses the AMF is alleviated, thereby effectively alleviating worsening of network congestion. For example, generally, after the UE receives the registration reject message, the UE adds the network corresponding to the AMF to another list. However, in the disaster scenario, the UE is allowed to access a network corresponding to another AMF again. If the above method is used, even if the UE receives the registration reject message, the UE still continuously accesses the network not allowed to be accessed, which not only affects a communication status of the UE, but also worsens the network congestion.

In a possible implementation, the network includes any one or more of a public land mobile network PLMN, a tracking area, or a part of a tracking area.

According to a sixth aspect, an embodiment of this application provides a communication apparatus configured to perform the method in the first aspect or any possible implementation of the first aspect. Alternatively, the communication apparatus is configured to perform the method in the second aspect or any possible implementation of the second aspect. Alternatively, the communication apparatus is configured to perform the method in the third aspect or any possible implementation of the third aspect. Alternatively, the communication apparatus is configured to perform the method in the fourth aspect. Alternatively, the communication apparatus is configured to perform the method in the fifth aspect or any possible implementation of the fifth aspect.

For example, the communication apparatus may include a transceiver unit and a processing unit. For specific descriptions of the transceiver unit and the processing unit, refer to the apparatus embodiments provided below.

According to a seventh aspect, an embodiment of this application provides a communication apparatus. The communication apparatus includes a processor configured to perform the method shown in the first aspect, the second aspect, the third aspect, the fourth aspect, the fifth aspect, or any possible implementation. Alternatively, the processor is configured to execute a program stored in the memory. When the program is executed, the method shown in the first aspect, the second aspect, the third aspect, the fourth aspect, the fifth aspect, or any possible implementation is performed.

During execution of the foregoing method, an information sending process in the foregoing method may be understood as a process in which the processor outputs the information or a process in which the processor receives the input information. During output of the information, the processor outputs the information to a transceiver, so that the transceiver transmits the information. After the information is outputted by the processor, other processing may further need to be performed before the information arrives at the transceiver. Similarly, during receiving of the input information by the processor, the transceiver receives the information, and inputs the information to the processor. Furthermore, after the transceiver receives the information, other processing may need to be performed on the foregoing information before the information is input to the processor.

Based on this principle, for example, the sending of the registration request message in the foregoing method may be understood as that the processor outputs the registration request message. For another example, receiving of the registration request message in the foregoing method may be understood as that the processor receives the input registration request message.

Unless otherwise specified, or if operations such as transmitting, sending, and receiving related to the processor do not contradict an actual function or internal logic of the operations in related descriptions, all the operations may be more generally understood as operations such as outputting, receiving, and inputting of the processor, instead of operations such as transmitting, sending, and receiving directly performed by a radio frequency circuit and an antenna.

During implementation, the processor may be a processor specially configured to perform these methods, or may be a processor, for example, a general-purpose processor, configured to execute a computer instruction in a memory to perform these methods. The memory may be a non-transitory memory, for example, a read only memory (ROM). The memory and the processor may be integrated on a same chip, or may be disposed on different chips. A type of the memory and a manner of disposing the memory and the processor are not limited in embodiments of this application. It may be understood that descriptions of the processor and the memory are also applicable to a sixth aspect shown below. For ease of description, details are not described in the sixth aspect.

In a possible implementation, the memory is located outside the communication apparatus.

In a possible implementation, the memory is located inside the communication apparatus.

In this embodiment of this application, the processor and the memory may alternatively be integrated into one device. In other words, the processor and the memory may alternatively be integrated together. In a possible implementation, the communication apparatus further includes a transceiver, and the transceiver is configured to receive a signal or send a signal.

It may be understood that for specific descriptions of each communication apparatus, refer to the following embodiments. Details are not described herein.

According to an eighth aspect, an embodiment of this application provides a communication apparatus. The communication apparatus includes a logic circuit and an interface, and the logic circuit is coupled to the interface.

In some embodiments of this application, the communication apparatus may be configured to perform steps performed by a UE. For example, the interface is configured to output a registration request message and input a registration response message. For another example, the logic circuit is configured to determine a waiting duration for sending the registration request message. For another example, the logic circuit is configured to determine that a disaster scenario exists.

In some other embodiments of this application, the communication apparatus may be configured to perform steps performed by an AMF. For example, the interface is configured to input a registration request message and output a registration response message. For another example, the logic circuit is configured to determine the registration response message and the like based on indication information and a load status.

In still some embodiments of this application, the communication apparatus may be configured to perform steps performed by a base station. For example, the logic circuit is configured to determine a maximum waiting duration based on a load status, and the interface is configured to output a system message and the like.

It may be understood that for descriptions of the registration request message, the registration response message, the indication information, the waiting duration, the maximum waiting duration, an identifier of the UE, and the like, refer to the descriptions of the first aspect to the fifth aspect, or refer to embodiments shown below. The details are not described herein.

According to a ninth aspect, an embodiment of this application provides a computer-readable storage medium. The computer-readable storage medium is configured to store a computer program. When the computer readable storage medium is run on a computer, the method shown in the first aspect or any possible implementation of the first aspect is performed, or the method shown in the second aspect or any possible implementation of the second aspect is performed, or the method shown in the third aspect or any possible implementation of the third aspect is performed, or the method shown in the fourth aspect is performed, or the method shown in the fifth aspect or any possible implementation of the fifth aspect is performed.

According to a tenth aspect, an embodiment of this application provides a computer program product. The computer program product includes a computer program or computer code. When the computer program product is run on a computer, the method shown in the first aspect or any possible implementation of the first aspect is performed, the method shown in the second aspect or any possible implementation of the second aspect is performed, or the method shown in the third aspect or any possible implementation of the third aspect is performed, or the method shown in the fourth aspect is performed, or the method shown in the fifth aspect or any possible implementation of the fifth aspect is performed.

According to an eleventh aspect, an embodiment of this application provides a computer program. When the computer program is run on a computer, the method shown in the first aspect or any possible implementation of the first aspect is performed, or the method shown in the second aspect or any possible implementation of the second aspect is performed, or the method shown in the third aspect or any possible implementation of the third aspect is performed, or the method shown in the fourth aspect is performed, or the method shown in the fifth aspect or any possible implementation of the fifth aspect is performed.

According to a twelfth aspect, an embodiment of this application provides a wireless communication system. The wireless communication system includes UE and an AMF. The UE is configured to perform the method shown in the first aspect or any possible implementation of the first aspect, and the AMF is configured to perform the method shown in the second aspect or any possible implementation of the second aspect. Alternatively, the wireless communication system includes a UE and a base station. The UE is configured to perform the method shown in the third aspect or any possible implementation of the third aspect, and the base station is configured to perform the method shown in the fourth aspect. Alternatively, the wireless communication system includes a UE and an AMF connected to the UE. The UE is configured to perform the method shown in the fifth aspect or any possible implementation of the fifth aspect.

DETAILED DESCRIPTION OF ILLUSTRATIVE EMBODIMENTS

Figure 1:
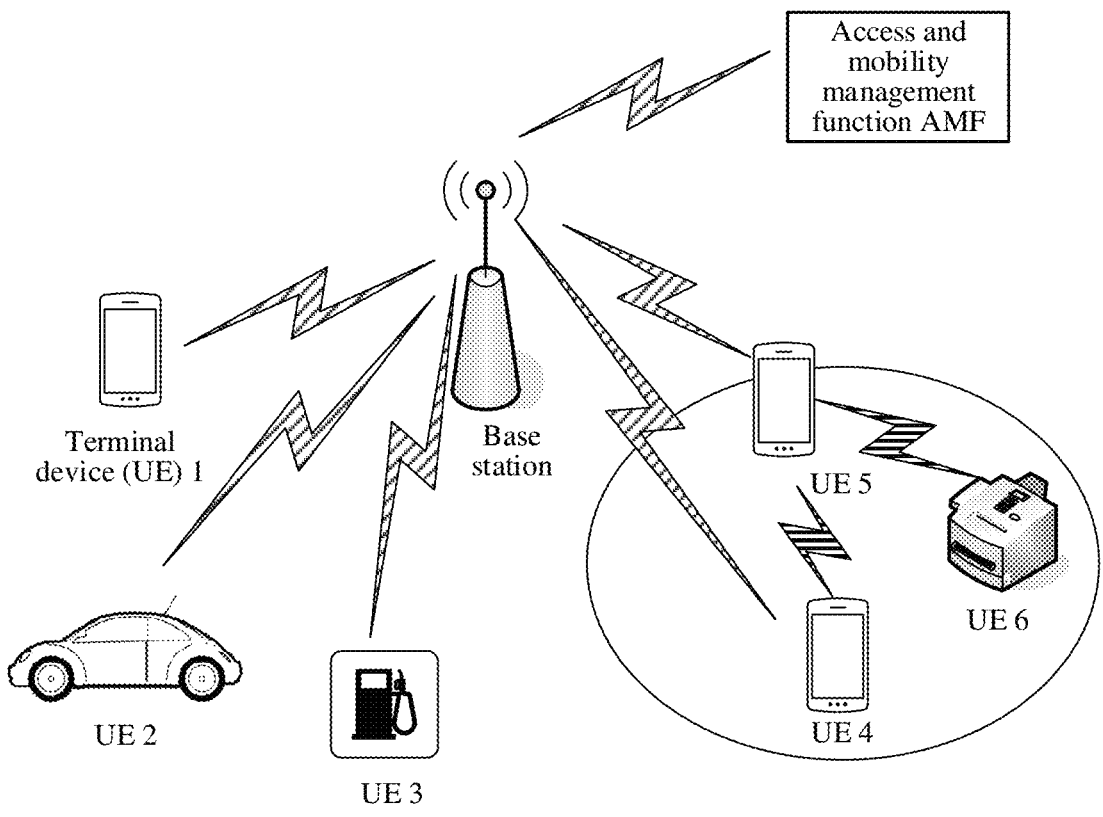
FIG. 1 is a schematic diagram of a communication system according to an embodiment of this application.

To make the objectives, technical solutions, and advantages of this application clearer, this application is further described with reference to the accompanying drawings.

Terms "first", "second", and the like in the specification, claims, and accompanying drawings of this application are merely used to distinguish between different objects, and are not used to describe a specific order. In addition, terms such as "include" and "have" and any other variants thereof are intended to cover a non-exclusive inclusion. For example, processes, methods, systems, products, or devices that include a series of steps or units is not limited to listed steps or units, but instead, optionally further include steps or units that are not listed, or optionally further include other steps or units inherent to these processes, methods, products, or devices.

"Embodiments" mentioned herein mean that specific features, structures, or characteristics described in combination with the embodiments may be included in at least one embodiment of this application. The phrase appearing at various locations in this specification does not necessarily indicate a same embodiment, and is not an independent or alternative embodiment exclusive to another embodiment. It may be understood explicitly and implicitly by a person skilled in the art that the embodiments described herein may be combined with other embodiments.

In this application, "at least one (item)" means one or more, "a plurality of" means two or more, "at least two (items)" means two or three or more, and "and/or" is used to describe an association relationship between associated objects, which indicates that three relationships may exist. For example, "A and/or B" may indicate: only A exists, only B exists, and both A and B exist. A and B may be singular or plural. The character "/" generally indicates that the associated objects are in an "or" relationship. "At least one of the following" or a similar expression thereof means any combination of these items. For example, at least one of a, b, or c may represent: a, b, c, "a and b", "a and c", "b and c", or "a and b and c".

The technical solutions provided in this application may be applied to various communication systems, such as a long term evolution (LTE) system, an LTE frequency division duplex (FDD) system, an LTE time division duplex (TDD), an Internet of Things (IoT) system, a narrowband Internet of Things system (NB-IoT), a wireless fidelity (Wi-Fi), a 5th generation (5G) communication system or new radio (NR), another future communication system.

The technical solutions provided in this application may be further applied to machine type communication (MTC), a long term evolution-machine (LTE-M) technology, and a device-to-device (D2D) network, a machine to machine (M2M) network, an Internet of Things (Internet of things, IoT) network, or another network. The IoT network may include, for example, the Internet of Vehicles. Communication manners in the Internet of Vehicles system are collectively referred to as vehicle to X (vehicle to X, V2X, where X may be anything). For example, the V2X may include vehicle to vehicle (V2V) communication, vehicle to infrastructure (V2I) communication, vehicle to pedestrian (V2P) communication, or vehicle to network (V2N) communication.

Terms in this application are described below in detail.

1. Terminal Device

The terminal device in this application is an apparatus with a wireless transceiver function. The terminal device may communicate with one or more core networks (core network, CN) devices (or may also be referred to as a core device) through an access network device (or may also be referred to as an access device) in a radio access network (RAN).

The terminal device may also be referred to as a user equipment (UE), an access terminal, a terminal, a subscriber unit, a subscriber station, a mobile station, a mobile console, a remote station, a remote terminal, a mobile device, a user terminal, a user agent, a user apparatus, or the like. In a possible implementation, the terminal device may be deployed on land, for example, deployed indoors or outdoors, deployed in a handheld form, or deployed in car. The terminal device may alternatively be deployed on a water surface (for example, deployed on a ship). The terminal device may alternatively be deployed in the air (for example, deployed on aircraft, a balloon, a satellite, or the like). In a possible implementation, the terminal device may be a handheld device, an in-car device, a wearable device, a terminal in the Internet of Things or the Internet of Vehicles, a terminal device in any form in a 5th generation (5G) network, a future network, or the like that has a wireless communication function. This is not limited in this application.

It may be understood that the terminal device shown in this application may not only include a vehicle (for example, a whole vehicle) in the Internet of Vehicles, but also may include an in-car device, an in-car terminal, or the like in the Internet of Vehicles. A specific form of the terminal device when applied to the Internet of Vehicles is not limited in this application.

It may be understood that the terminal devices shown in this application may further communicate with each other by using a technology such as device to device (D2D), vehicle to everything (V2X), or machine to machine (M2M). A communication method between the terminal devices is not limited in this application.

2. AMF

As a mobile bandwidth access service expands, a mobile network also develops to better support diversified business models, so as to meet the requirements of more diversified application services and industries. For example, to provide better and more complete services for more industries, a network architecture of the 5G network is adjusted compared with that of a 4G network. For example, in the 5G network, a mobility management entity (MME) in the 4G network is split into a plurality of network elements (or may be referred to as a network function) such as an access and mobility management function (AMF) and a session management function (SMF).

The AMF in this application is a control plane network function provided by a PLMN, and is responsible for access control and mobility management when a UE accesses the PLMN, for example, includes functions such as mobility status management, temporary user identity assignment, and user authentication and authorization. Therefore, as the mobile network develops, even if the AMF may evolve into another form, name, or the like, the AMF falls within the protection scope of this application as long as the method shown in this application can be implemented.

3. Base Station

The base station may be an apparatus that is deployed in a radio access network and that provides a wireless communication service for a terminal device. The base station in this application may also be referred to as an access network device, an access device, a RAN device, or the like.

For example, the base station shown in this application may include but is not limited to a next generation base station (gNB) in a 5G system, an evolved NodeB (eNB) in an LTE system, a radio network controller (RNC), a NodeB (NB), a base station controller (BSC), a base transceiver station (BTS), a home NodeB (home evolved NodeB, or home NodeB, HNB), a base band unit (BBU), a transmission and receiving point (TRP), a transmission point (TP), a small base station device (pico), a mobile switching center, or a network device in a future network. Alternatively, the base station may be a device that carries a base station function in D2D, V2X, M2M, or the like. In systems of different radio access technologies, names of devices that have an access network device function may be different.

Optionally, in some deployments of the base station, the base station may include a central unit (CU), a distributed unit (DU), and the like. In some other deployments of the base station, the CU may be further divided into a CU-control plane (CP), a CU-user plane (UP), and the like. In still some other deployments of the base station, the base station may alternatively be an open radio access network (ORAN) architecture, or the like. The specific deployment manner of the base station is not limited in this application.

Based on the foregoing UE, AMF, and base station, an embodiment of this application provides a communication system, as shown in FIG. 1. FIG. 1 is a schematic diagram of a communication system according to an embodiment of this application. As shown in FIG. 1, the communication system may include at least one base station, at least one terminal device, such as a UE 1 to a UE 6 in FIG. 1, and an AMF. It may be understood that for specific descriptions of the AMF, the UEs, and the base station, refer to the foregoing description. The details are not described herein.

For example, the UEs may directly communicate with each other. For example, direct communication between UEs may be implemented by using the D2D technology. As shown in FIG. 1, the UE 4 and the UE 5 and the UE 4 and the UE 6 may directly communicate by using the D2D technology. The UE 4 or the UE 6 may communicate with the UE 5 alone or simultaneously. For another example, the UE 4 to the UE 6 may separately communicate with the base station. For example, the UE 4 or the UE 6 may directly communicate with the base station, or may indirectly communicate with the base station. For example, the UE 6 may communicate with the base station through the UE 5. It should be understood that FIG. 1 shows an example of a communication link between one base station and a plurality of UEs and between communication devices. Alternatively, the communication system may include a plurality of base stations, and a coverage of each base station may include another quantity of UEs, for example, more or fewer UEs. This is not limited in this embodiment of this application.

Optionally, the communication system shown in FIG. 1 may further include a unified data management (UDM) network element, an authentication server function (AUSF) network element, and the like. A specific structure of the communication system is not limited in this embodiment of this application. For example, the unified data management UDM is a control plane function provided by an operator, and is responsible for storing information such as a subscriber permanent identifier (SUPI), a security context, and subscription data of a subscriber in a PLMN. The AUSF is a control plane function provided by an operator and is usually used for authentication, for example, authentication between the terminal device (a subscriber) and the PLMN. Alternatively, the communication system may further include another network element such as a network controller and a session management function (SMF). This is not limited in this embodiment of this application.

If emergencies such as a disaster occurs in a HPLMN the UE currently accesses, to reduce service interruption of the UE, the UE needs to roam to another PLMN that can provide services (even if the UE does not activate a roaming agreement). When the fault is removed, the UE may access to the original PLMN (for example, the HPLMN) again. In other words, in a disaster scenario, the HPLMN to which the UE connects is usually destroyed. As a result, the UE cannot effectively access the HPLMN, which results in service interruption of the UE. To ensure service continuity, the UE may register with a PLMN that provides disaster roaming services.

In view of this, this application provides a communication method and apparatus, so that the AMF that receives a registration request message sent by the UE clearly learns whether the UE is in a disaster scenario, thereby improving efficiency of information exchange. In addition, according to the communication method provided in this application, service interruption of the UE in the disaster scenario can be effectively reduced. For a communication system to which this application is applicable, refer to the foregoing description (for example, FIG. 1), and details are not described herein.

Figure 2:
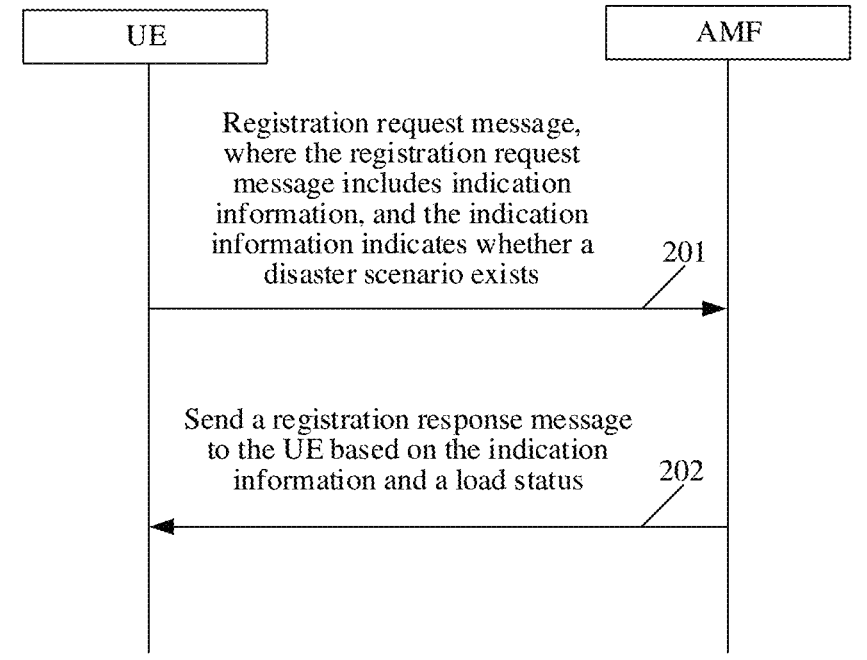
FIG. 2 to FIG. 5 are schematic flowcharts of a communication method according to an embodiment of this application.

FIG. 2 is a schematic flowchart of a communication method according to an embodiment of this application. As shown in FIG. 2, the method includes the following steps.

201: A UE sends a registration request message to an AMF, where the registration request message includes indication information, and the indication information indicates whether a disaster scenario exists. Correspondingly, the AMF receives the registration request message.

When a disaster occurs, a base station, a core network element, or the like may be damaged, causing the UE to be disconnected from the network. In other words, the disaster causes interruption of a communication service. For example, natural disasters such as an earthquake may cause fires or power failures on some radio access network devices. As a result, coverage of cells between a radio access network and a core network suddenly disappears or no route exists between the radio access network and the core network. Human-made disasters, such as installation of defective software or improperly managed certificates, may cause abnormal behavior on the radio access network, causing a user within the network to fail in exchange of signaling or data. It may be understood that the disaster scenario described in this embodiment of this application may also be referred to as a disaster roaming (disaster roaming) scenario or the like, and the specific name of the disaster scenario is not limited in this embodiment of this application.

It may be understood that how the UE determines that the UE is in the disaster scenario is not limited in this embodiment of this application. For example, when the UE cannot access a previous PLMN, the UE learns that the UE is in the disaster scenario. Alternatively, when the UE attempts to access a network such as a roaming network again after being disconnected from the previous network, the UE may learn, based on a broadcast message of a base station in the roaming network, that the UE is in the disaster scenario. The foregoing method for determining that the UE is in the disaster scenario is merely an example, and should not be construed as a limitation on this embodiment of this application. Therefore, the UE may send the registration request message to the AMF of the roaming network.

In this embodiment of this application, that the indication information indicates whether the disaster scenario exists may be understood as follows: the indication information indicates whether the UE is in the disaster scenario, or the indication information indicates whether an HPLMN of the UE is in the disaster scenario, or the indication information indicates whether the previous network corresponding to the UE is in the disaster scenario, or the indication information indicates whether the registration request message is initiated in the disaster scenario, or the indication information indicates whether the UE initiates the registration request message in the disaster scenario, or the like. This is not limited in this embodiment of this application. In other words, whether the registration request message is for registration in the disaster scenario may be indicated through the indication information. It may be understood that the foregoing indication information may also be referred to as a disaster condition indication (disaster condition indication), or the like. The specific name of the indication information is not limited in this embodiment of this application.

For example, when the indication information is a first value, the indication information indicates that the disaster scenario exists. When the indication information is a second value, the indication information indicates that the disaster scenario does not exist. For example, whether the disaster scenario exists may be indicated through 1-bit indication information. For example, the first value may be 1, and the second value may be 0. In other words, after the UE determines that the UE roams from another network to a roaming network because of a disaster, the UE may send, to the AMF, the registration request message that carries the indication information, where the indication information is the first value. Through the 1-bit information, the AMF can learn whether the UE is in the disaster scenario, and can further effectively support a registration process of the UE regardless of whether the UE is in or not in the disaster scenario. Certainly, a specific bit of the indication information is not limited in this embodiment of this application.

For example, content included in the registration request message may be shown in Table 1. It may be understood that the following content included in the registration request message is merely an example, and should not be construed as a limitation on this embodiment of this application.

TABLE 1

| Information element identifier (IEI) | Information element | Type/ Reference | Pres- ence | Format | Length |
|---|---|---|---|---|---|
| | Extended protocol discriminator | Extended protocol discriminator 9.2 | M | V | 1 |
| | Security header type | Security header type 9.3 | M | V | ½ |
| | Spare half octet | Spare half octet 9.5 | M | V | ½ |
| | Registration request message identifier | Message type 9.7 | M | V | 1 |

TABLE 1-continued

| Information element identifier (IEI) | Information element | Type/ Reference | Pres- ence | Format | Length |
|---|---|---|---|---|---|
| | 5GS registration type | 5GS registration type 9.11.3.7 | M | V | ½ |
| . . . | . . . | . . . | . . . | . . . | . . . |
| 30 | Requested NB-N1 mode discontinuous reception parameter (Requested NB-N1 mode DRX parameters) | NB-N1 mode DRX parameters 9.11.3.73 | O | TLV | 3 |
| XX | Disaster scenario indication (Disaster condition indication) | Disaster condition indication | O | TV | ½ |

In a possible implementation, the registration request message further includes a registration type, and the registration type includes: any one of initial registration, mobility registration updating, periodic registration updating, or emergency registration.

For example, the registration type may be indicated by using three bits, as shown in Table 2. It may be understood that a relationship between bits and a registration type shown in Table 2 is merely an example.

TABLE 2

| Bits | Registration type |
|---|---|
| 001 | Initial registration |
| 010 | Mobility registration updating |
| 011 | Periodic registration updating |
| 100 | Emergency registration |
| 111 | Reserved (reserved) |

In this embodiment of this application, with reference to the indication information and the registration type, the AMF not only can learn that the UE is in the disaster scenario, but also can learn whether the registration request message is for initial registration, mobility registration updating, periodic registration updating, or emergency registration in the disaster scenario.

For example, in Table 3, disaster roaming initial registration is added so that the AMF learns that the UE is in the disaster scenario. In Table 4, disaster roaming registration is added so that the AMF learns that the UE is in the disaster scenario. However, when the UE is in the disaster scenario, the type of the initiated registration request message may not be limited to the disaster roaming initial registration. Alternatively, the disaster roaming registration may have a semantic conflict with the initial registration, the mobility registration updating, the periodic registration updating, or the emergency registration. In the methods shown in Table 3 and Table 4, during initial registration of the UE, whether the registration request message includes the initial registration type or the disaster initial registration cannot be effectively determined. Since semantically, the initial registration may include the disaster initial registration, logical scope inconsistency may exist.

However, in this embodiment of this application, the indication information is added to the registration request message. Compared with the registration types shown in Table 3 or Table 4, more registration types in the disaster scenario can be indicated, so that the AMF can use different registration access control methods for different types of registration request messages. For example, for the initial registration, the AMF may perform an authentication operation, assign a tracking area, or the like. For another example, for the mobility registration updating, the AMF may not perform authentication or the like.

In addition, the AMF can explicitly learn whether the UE is in the disaster scenario. In other words, the AMF can effectively determine which type of UE sends the registration request message received by the AMF. For example, the AMF can effectively determine a local network access UE (also referred to as a local network access user or a local network access device), an international roaming UE (also referred to as an international roaming user, an international roamer, or the like), or a disaster roaming UE (also referred to as a disaster roaming user or a disaster roamer). If the registration request message does not include the indication information, it is difficult for the AMF to know whether the registration request message is initiated by a roaming UE in the disaster scenario or initiated by a roaming subscribed UE. As a result, the AMF knows that the UE is actually an unsubscribed UE and is a roaming UE in the disaster scenario only after authentication by the HPLMN. This further affects a control policy that the AMF needs to take on the UE in the disaster scenario (for example, a control policy used by the AMF is delayed).

TABLE 3

| Bits | Registration type |
| --- | --- |
| 001 | Initial registration |
| 010 | Mobility registration updating |
| 011 | Periodic registration updating |
| 100 | Emergency registration |
| 101 | Disaster roaming initial registration |
| 111 | Reserved |

TABLE 4

| Bits | Registration type |
| --- | --- |
| 001 | Initial registration |
| 010 | Mobility registration updating |
| 011 | Periodic registration updating |
| 100 | Emergency registration |
| 101 | Disaster roaming registration |
| 111 | Reserved |

It may be understood that when the UE sends the registration request message, if the registration request message does not include the foregoing indication information, it may indicate that the UE is not in the disaster scenario.

202: The AMF sends a registration response message to the UE based on the indication information and a load status. Correspondingly, the UE receives the registration response message.

The load status may include a load status of the AMF or a load status of a network corresponding to the AMF. How the AMF learns the load status of the network corresponding to the AMF is not limited in this embodiment of this application.

In this embodiment of this application, the registration response message includes a registration accept message or a registration reject message. For example, the AMF determines the registration accept message or the registration reject message based on the indication information and the load status, so as to send the registration accept message or the registration reject message to the UE. For example, the AMF may determine a threshold based on the indication information, and then determine the registration accept message or the registration reject message based on the load status and the threshold. For example, the indication information indicates that the disaster scenario exists, and the threshold is a first threshold (which may also be referred to as a disaster load threshold or the like). For another example, if the indication information indicates that the disaster scenario does not exist, the threshold is a second threshold (which may also be referred to as a non-disaster load threshold or the like).

In other words, in this embodiment of this application, different thresholds may be determined based on whether the disaster scenario exists. In this way, the AMF can use different control measures based on a corresponding threshold and the load status. For example, after the registration request message is received, if the indication information is the first value such as 1, the AMF may determine, based on the first threshold, whether to accept registration of the UE. For example, if the load status exceeds the first threshold, the registration request message may be rejected. Otherwise, the registration request message is accepted. If the indication information is the second value such as 0, or does not carry the indication information, it indicates that the UE is a local network UE or a roaming subscribed UE, and whether to accept the registration of the UE may be determined based on the second threshold.

It may be understood that specific criteria of the first threshold and the second threshold are not limited in this embodiment of this application. For example, the load status may be determined based on a quantity of connected UEs, and the first threshold and the second threshold may be set based on a criterion for accessing of the UEs. For another example, the load status may be determined based on a load percentage of the network (or a load percentage of the AMF), the first threshold and the second threshold may be set based on the load percentage of the network. Specific criteria of the load status, the first threshold, and the second threshold are not limited in this embodiment of this application.

Optionally, the first threshold may be greater than the second threshold. In this case, when the disaster scenario exists, it can be ensured that the UE in the disaster scenario preferentially accesses the network. For example, since it is ensured that the UE in the disaster scenario preferentially accesses the network, the UE can communicate with the outside quickly or in a timely manner. Optionally, the first threshold may be less than the second threshold. In this case, since the UE in the disaster scenario is a roaming unsubscribed UE, to ensure communication quality of the home network UE and the roaming subscribed UE, the first threshold may be less than the second threshold. A magnitude relationship between the first threshold and the second threshold is not limited in this embodiment of this application.

In this embodiment of this application, the registration request message includes the indication information. On the one hand, the AMF explicitly learns whether the UE is in the disaster scenario, thereby improving efficiency of information exchange. On the other hand, the AMF may further learn the reason why the UE accesses the roaming network (for example, a roaming PLMN or a network corresponding to the AMF).

Figures 3, 4:
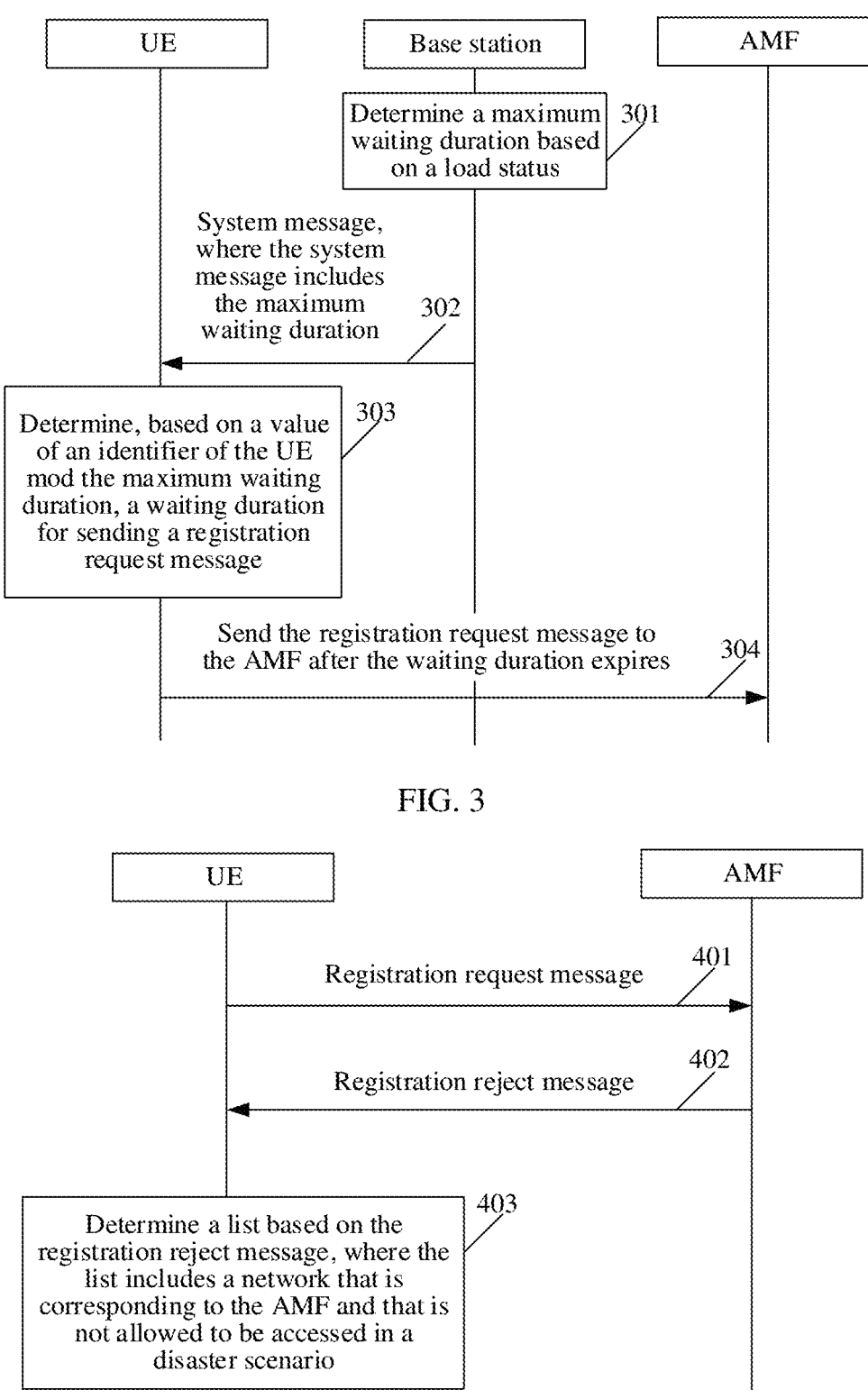

FIG. 3 is a schematic flowchart of a communication method according to an embodiment of this application. As shown in FIG. 3, the method includes the following steps.

301: A base station in a roaming network determines a maximum waiting duration based on a load status.

The maximum waiting duration may also be referred to as a maximum network access waiting duration (inbound-waiting-max-time), a disaster roaming waiting range (disaster roaming waiting range), a maximum roaming waiting duration, or the like. The specific name of the maximum waiting duration is not limited in this embodiment of this application.

In this embodiment of this application, the load status may include a load status of the base station or a load status of a network corresponding to the base station. That the base station determines the maximum waiting duration based on the load status means that the base station may dynamically adjust the maximum waiting duration based on the load status. For example, a higher load (which may also be understood as a heavier load) indicates a longer maximum waiting duration. A lower load indicates a shorter maximum waiting duration. Through association of the load status with the maximum waiting duration, the load status of the base station or the load status of the network can be effectively improved. In other words, it is ensured that the UEs are evenly distributed in different time ranges. For example, when the load is light, the UEs may perform accessing intensively in a short time, and when the load is heavy, the UEs may perform accessing sparsely in a long time. In this way, network congestion can be effectively alleviated.

It may be understood that a specific relationship between a load and a maximum waiting duration is not limited in this embodiment of this application. Similarly, a measurement of the maximum waiting duration is not limited. For example, the maximum waiting duration may be measured in seconds, for example, 5 s or 255 s.

302: The base station sends a system message to a UE, where the system message includes the maximum waiting duration. Correspondingly, the UE receives the system message.

For example, the system message may include a system information block (system information block) 1, another SIB (referred to as a SIB-vX below), or the like. This is not limited in this embodiment of this application.

For example, a signaling format of the SIB1 may be shown as follows:

```
SIB1-v17XX-IEs ::=   SEQUENCE {
   inbound-waiting-max-time   INTEGER (1..255)   OPTIONAL}
```

SIB1-v17XX-IEs indicates a version (version, v) number of the system message, inbound-waiting-max-time indicates the maximum waiting duration, and INTEGER indicates a specific value of the maximum waiting duration.

For example, a signaling format of the SIB-vX may be shown as follows:

```
SIB-vX-IEs ::=   SEQUENCE {
   inbound-waiting-max-time   INTEGER (1..255)   OPTIONAL}
```

It may be understood that SIB-vX-IEs indicates a version number of a system message, inbound-waiting-max-time indicates the maximum waiting duration, and INTEGER indicates the specific value of the maximum waiting duration.

If the maximum waiting duration is included in the SIB-vX and the system message does not include the SIB-vX, it indicates that the UE may immediately send the registration request message. In other words, when the UE does not need to wait, the system message may not include the SIB-vX.

303: The UE determines, based on a value of an identifier of the UE mod the maximum waiting duration, a waiting duration for sending a registration request message.

In this embodiment of this application, the identifier of the UE may include a 5th generation system (5GS) mobile identity (5GS mobile identity), for example, may include a subscription concealed identifier (SUCI) of the UE, a globally unique temporary UE identity (GUTI), a subscription permanent identifier (SUPI), an international mobile equipment identity (IMEI), an international mobile subscriber identity (IMSI), or the like. The IMSI is used as an example. The UE may determine, based on the IMSI and the maximum waiting duration, the waiting duration for sending the registration request message. For example, the maximum waiting duration is 30, an IMSI of a UE 1 is 460011234567891, and an IMSI of a UE 2 is 460011234567898. A value of the IMSI mod the maximum waiting duration (for example, IMSI mod (inbound-waiting-max-time)) is, for example, 460011234567891 mod 30=21, and 460011234567898 mod 30=28. The UE 1 needs to wait 21 s before sending the registration request message, and the UE 2 needs to wait 28 s before sending the registration request message. Since the waiting durations of the UE 1 and the UE 2 are different, network congestion caused by simultaneous initiation of the registration requests by the UE 1 and the UE 2 can be effectively avoided.

It may be understood that, the UE may perform timing on the waiting duration of the registration request message by using a timer when camping on a cell. Alternatively, the UE may perform timing on the waiting duration of the registration request message by using a timer when obtaining a broadcast message of the base station in the roaming network. A time at which the UE starts timing is not limited in this embodiment of this application.

In this embodiment of this application, since the IMSI may be unique (similar to a phone number) in each UE, its distribution is statistically random and even in a network. This ensures that a result obtained after the modulo operation of a random number mod the maximum waiting duration is randomly and evenly distributed from 0 to the maximum waiting duration, and ensures that UEs are evenly distributed in different time ranges.

304: The UE sends the registration request message to the AMF after the waiting duration expires. Correspondingly, the AMF receives the registration request message.

Specific content of the registration request message is not limited in this embodiment of this application. In other words, the method provided in this embodiment of this application may not be only applied to a non-disaster scenario, for example, in which the UE may be a roaming subscribed UE, but may also be applied to a disaster scenario, for example, in which the UE may be disaster roaming UE. For a specific description of the non-disaster scenario, refer to a related standard or protocol, and the details are not described herein.

For example, when the UE determines that the UE is in a disaster scenario, the UE sends the registration request message to the AMF. For a specific description of how the UE determines that the UE is in the disaster scenario, refer to the method shown in FIG. 2, and the details are not described herein. In this case, the registration request message may not include indication information. For example, the registration request message may include a registration type.

For another example, the registration request message may include indication information. Therefore, the indication information explicitly indicates whether the disaster scenario exists. For a specific description of the case in which the disaster scenario exists, refer to the method shown in FIG. 2. In other words, the method shown in FIG. 3 may be combined with the method shown in FIG. 2. A specific description of the indication information and the like is not provided herein. In addition, a specific description of sending, by the AMF, a registration response message to the UE based on the indication information and a load status is not provided.

According to the method provided in this embodiment of this application, when the UEs need to access the roaming network, the base station in the roaming network determines the maximum waiting duration based on the load status, so that time points of accessing the roaming network by the UEs can be effectively balanced, thereby alleviating a case in which a large quantity of UEs access the roaming network. In addition, the waiting duration is determined by using the value of the identifier of the UE mod the maximum waiting duration, so that a case in which a large quantity of UEs simultaneously access the network corresponding to the AMF can be alleviated, thereby ensuring access randomness of the UEs while minimizing a calculation amount.

FIG. 4 is a schematic flowchart of a communication method according to an embodiment of this application. As shown in FIG. 4, the method includes the following steps.

401: A terminal device sends a registration request message to an AMF, and the AMF receives the registration request message.

402: The AMF sends a registration reject message to the UE, and the UE receives the registration reject message.

It may be understood that for specific descriptions of step 401 and step 402, refer to a related standard, protocol, or the like. The registration request message and the registration reject message are not limited in this embodiment of this application.

403: The UE determines a list based on the registration reject message, where the list includes a network that is corresponding to the AMF and that is not allowed to be accessed in a disaster scenario.

In this embodiment of this application, after receiving the registration reject message, the UE may add, to the list, the network that is corresponding to the AMF and that is not allowed to be accessed by the UE, to prevent the UE from repeatedly attempting to access the network. For example, the registration request message may be initial registration initiated by the UE (for example, the UE initially attempts to access the AMF in a roaming network). Therefore, the UE may add the network corresponding to the AMF that the UE initially attempts to access to the list. For example, the registration request message may alternatively not be the initial registration initiated by the UE, but a registration request message re-initiated by the UE after the UE is rejected for one or more times. In this case, since the UE has failed in the plurality of attempts to access the AMF, the UE may add the network corresponding to the AMF to the list. This effectively prevents the UE from wasting resources or time for attempting to access the network again and from being rejected again.

It may be understood that the network includes any one or more of a PLMN, a tracking area, or a part of a tracking area. For example, the list includes a disaster forbidden PLMN list (disaster forbidden PLMN List) and a disaster forbidden tracking areas list (disaster forbidden tracking areas list) (also referred to as a disaster forbidden tracking area of roaming list) or a disaster forbidden tracking areas for regional provision of list (or may be referred to as a disaster forbidden tracking areas for regional provision of service list).

In a possible implementation, the method provided in this embodiment of this application may be further combined with the method shown in FIG. 2. For example, the registration request message includes indication information, so that the AMF may send the registration reject message to the UE based on the indication information and the load status.

In a possible implementation, the method provided in this embodiment of this application may be further combined with the method shown in FIG. 3. For example, the base station in the roaming network determines the maximum waiting duration based on the load status, and sends the maximum waiting duration to the UE. Then, the UE determines, based on the value of the identifier of the UE mod the maximum waiting duration, the waiting duration for sending the registration request message, and sends the registration request message to the AMF after the waiting duration expires.

Figure 5:
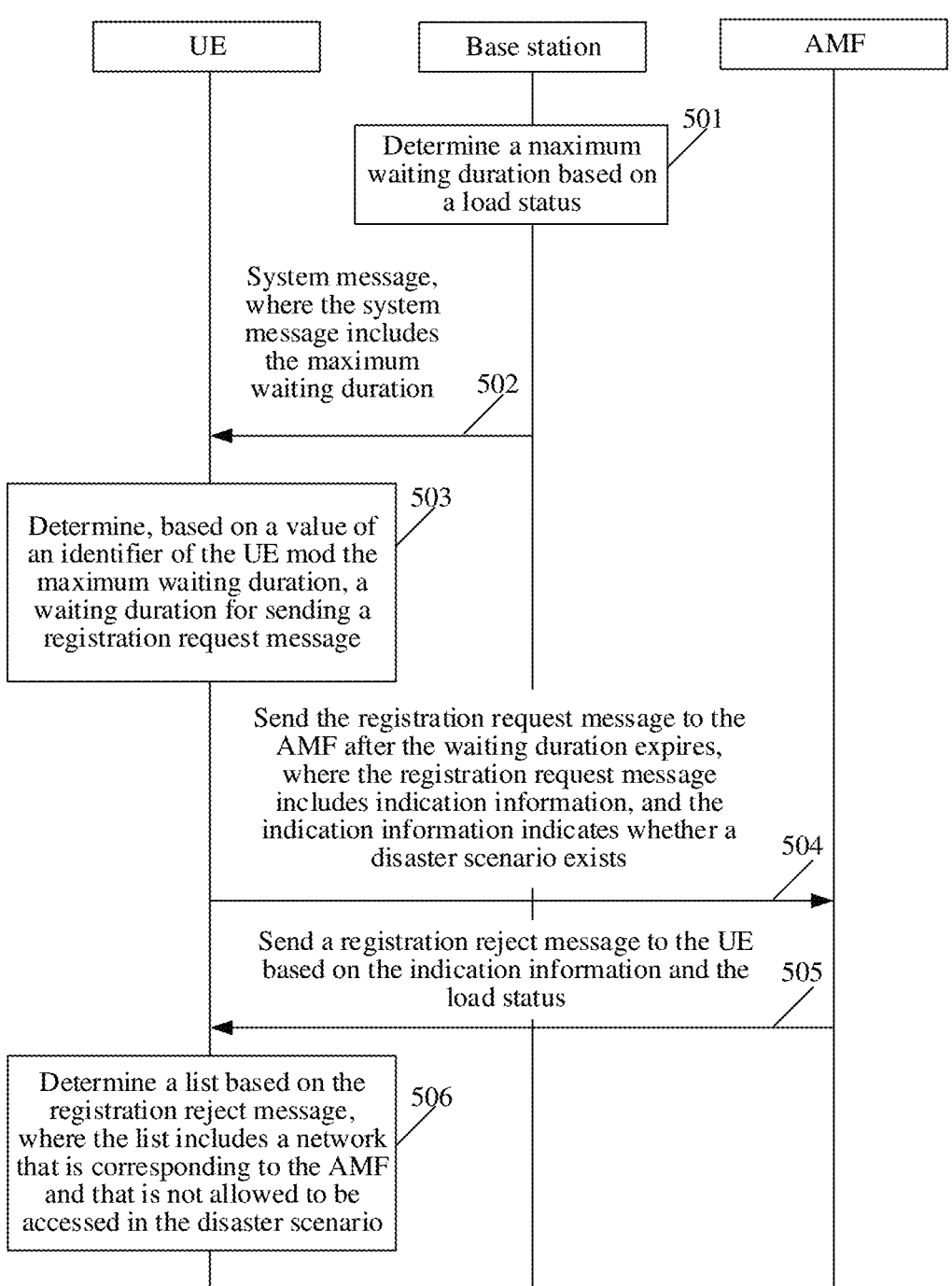

In a possible implementation, the method provided in this embodiment of this application may be further combined with the methods shown in FIG. 2 and FIG. 3. For a specific description of the combination of the methods in FIG. 2, FIG. 3, and FIG. 4, refer to FIG. 5 shown below. The details are not described herein.

Generally, after the UE receives the registration reject message, the UE adds the network corresponding to the AMF to another list, for example, a forbidden list in a related standard or protocol. However, in the disaster scenario, the UE is allowed to access the network corresponding to the another AMF again. If the above method is used, even if the UE receives the registration reject message, the UE still repeatedly attempts to access the rejected network, which not only affects a communication status of the UE, but also worsens the network congestion.

However, according to the method provided in this embodiment of this application, through the list, the UE may add the network corresponding to the AMF to the list after receiving the registration reject message from the AMF. In this way, a case in which the UE repeatedly accesses the AMF is alleviated, thereby effectively alleviating worsening of network congestion.

It may be understood that the embodiments shown above may be independent solutions, or may be combined based on internal logic. These solutions all fall within the protection scope of this application. For example, the embodiments shown above may be combined with each other. For example, the methods shown in FIG. 2 and FIG. 3 may be combined with each other. For another example, the methods shown in FIG. 2 and FIG. 4 may be combined with each other. For another example, the methods shown in FIG. 3 and FIG. 4 may be combined with each other. For another example, the methods shown in FIG. 2, FIG. 3, and FIG. 4 may be combined with each other. For an example of the combination of FIG. 2 to FIG. 4, refer to the method shown in FIG. 5.

FIG. 5 is a schematic flowchart of a communication method according to an embodiment of this application. As shown in FIG. 5, the method includes the following steps.

501: Abase station in a roaming network determines a maximum waiting duration based on a load status.

502: The base station sends a system message to a UE, where the system message includes the maximum waiting duration. Correspondingly, the UE receives the system message.

503: The UE determines, based on a value of an IMSI of the UE mod the maximum waiting duration, a waiting duration for sending a registration request message.

504: The UE sends the registration request message to the AMF after the waiting duration expires. Correspondingly, the AMF receives the registration request message. The registration request message includes indication information, and the indication information indicates whether a disaster scenario exists.

505: The AMF sends a registration reject message to the UE based on the indication information and a load status. Correspondingly, the UE receives the registration reject message.

506: The UE determines a list based on the registration reject message, where the list includes a network that is corresponding to the AMF and that is not allowed to be accessed in a disaster scenario.

It may be understood that for a specific description of the method shown in FIG. 5, refer to FIG. 2 to FIG. 4, and the details are not described one by one herein. For example, for step 501 to step 504, refer to the method shown in FIG. 3. For the registration request message shown in step 504 and step 505, refer to the method shown in FIG. 2. For step 506, refer to the method shown in FIG. 4.

It may be understood that, in the foregoing embodiments, authentication may further be performed between the AMF and an AUSF in the HPLMN of the UE. For example, after the AMF receives the registration request message, the AMF may send an authentication request (authenticate request) to the AUSF in the HPLMN, and the AUSF sends the authentication request to a UDM in the HPLMN. The UDM sends an authentication response to the AUSF, the AUSF sends the authentication response (authenticate response) to the AMF, and the AMF sends the authentication response to the UE. It may be understood that for a process of the authentication between the UE and the AMF and a process of authentication between the AMF and the AUSF in the HPLMN, refer to a related standard, protocol, or the like. This is not limited in this embodiment of this application.

According to the method provided in this embodiment of this application, not only the AMF in the roaming network can learn whether the UE is in the disaster scenario, but also the AMF can determine, based on the scenario in which the UE is located, whether to send the registration reject message to the UE. In this way, after receiving the registration reject message, the UE adds the network corresponding to the AMF to the list, so as to avoid a resource waste caused by a plurality of access attempts by the UE.

A communication apparatus provided in an embodiment of this application is described below.

In this application, the communication apparatus is divided into function modules based on the foregoing method embodiments. For example, each function module may be divided to each corresponding function, or two or more functions may be integrated into one processing module. The integrated module may be implemented in a form of hardware, or may be implemented in a form of a software function module. It should be noted that the module division in this application is an example, and is merely logical function division. During actual implementation, the modules may be divided in another manner. A communication apparatus in an embodiment of this application is described below in detail with reference to FIG. 6 to FIG. 8.

Figure 6:
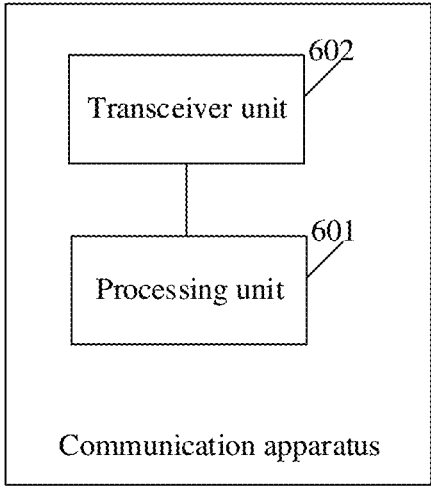
FIG. 6 to FIG. 8 are schematic structural diagrams of a communication apparatus according to an embodiment of this application.

FIG. 6 is a schematic structural diagram of a communication apparatus according to an embodiment of this application. As shown in FIG. 6, the communication apparatus includes a processing unit 601 and a transceiver unit 602.

In some embodiments of this application, the communication apparatus may be the terminal device shown above, a chip in the terminal device, or the like. In other words, the communication apparatus may be configured to perform steps, functions, or the like performed by the terminal device in the foregoing method embodiments.

For example, the transceiver unit 602 is configured to output a registration request message, where the registration request message includes indication information, and the indication information indicates whether a disaster scenario exists. The transceiver unit 602 is further configured to input the registration response message.

In this embodiment of this application, that the transceiver unit 602 is configured to output the registration request message includes: the transceiver unit 602 is configured to send the registration request message to the AMF. That the transceiver unit 602 is configured to input the registration response message includes: the transceiver unit 602 is configured to receive the registration response message from the AMF.

For example, the transceiver unit 602 may be further configured to perform the sending step in step 201 shown in FIG. 2, and the transceiver unit 602 may be further configured to perform the receiving step in step 202 shown in FIG. 2. For another example, the transceiver unit 602 may be further configured to perform the sending step in step 502 shown in FIG. 5, and the processing unit 601 may be further configured to perform step 503 shown in FIG. 5. The transceiver unit 602 may be further configured to perform the sending step in step 504 and the receiving step in step 505 shown in FIG. 5, and the processing unit 601 may be further configured to perform step 506 shown in FIG. 5.

Specific descriptions of the transceiver unit and the processing unit are not described in detail one by one herein. For example, the processing unit 601 may perform, through the transceiver unit 602, the step of outputting the registration request message, the step of inputting the registration response message, and the like.

It may be understood that, for descriptions of the registration request message, the indication information, a registration type, the disaster scenario, and the like in this embodiment of this application, refer to descriptions in the foregoing method embodiments (for example, FIG. 2 and FIG. 5). The details are not described one by one herein.

For example, the transceiver unit 602 is configured to input system message, where the system message includes a maximum waiting duration. The processing unit 601 is configured to determine, based on the identifier of the communication apparatus and the maximum waiting duration, the waiting duration for sending the registration request message. The transceiver unit 602 is further configured to output the registration request message after the waiting duration expires.

It may be understood that the transceiver unit 602 is configured to input a system message includes: the transceiver unit 602 is configured to receive the system message from a base station in a roaming network. That the transceiver unit 602 is further configured to output the registration request message after the waiting duration expires includes: the transceiver unit 602 is further configured to send the registration request message to the AMF after the waiting duration expires.

For example, the transceiver unit 602 may be further configured to perform the receiving step in step 302 shown in FIG. 3, the processing unit 601 may be further configured to perform step 303 shown in FIG. 3, and the transceiver unit 602 may be further configured to perform the sending step in step 304 shown in FIG. 3.

It may be understood that in this embodiment of this application, for descriptions of the system message, the maximum waiting duration, the identifier (including the IMSI) of the communication apparatus, the registration request message, the disaster scenario, and the like, refer to descriptions in the foregoing method embodiment (as shown in FIG. 3 or FIG. 5), and the details are not described one by one herein.

For example, the transceiver unit 602 is configured to output the registration request message and input the registration reject message. The processing unit 601 is configured to determine a list based on the registration reject message, where the list includes a network that is corresponding to the AMF and that is not allowed to be accessed in the disaster scenario.

For example, the transceiver unit 602 may be further configured to perform the sending step in step 401 shown in FIG. 4 and the receiving step in step 402, and the processing unit 601 may be further configured to perform step 403 shown in FIG. 4.

It may be understood that, for descriptions of the registration request message, the registration reject message, the list, and the like, refer to the description of the foregoing method embodiment (as shown in FIG. 4 or FIG. 5), and the details are not described one by one herein.

FIG. 6 is reused. In some other embodiments of this application, the communication apparatus may be the AMF shown above, a chip in the AMF, or the like. In other words, the communication apparatus may be configured to perform steps, functions, or the like performed by the AMF in the foregoing method embodiments.

For example, the transceiver unit 602 is configured to input the registration request message, where the registration request message includes the indication information, and the indication information indicates whether the disaster scenario exists. The processing unit 601 is configured to output the registration response message based on the indication information and a load status through the transceiver unit 602. In this embodiment of this application, the processing unit 601 is configured to determine the registration response message based on the indication information and the load status, and then output the registration response message through the transceiver unit 602.

For another example, the processing unit 601 is configured to determine a threshold based on the indication information. The transceiver unit 602 outputs a registration accept message or a registration reject message based on the load status and the threshold.

For example, the transceiver unit 602 may be further configured to perform the receiving step in step 201, the sending step in step 202, and the like shown in FIG. 2. Details are not described herein. For another example, the transceiver unit 602 may be further configured to perform the receiving step in step 504 and the sending step in step 505 shown in FIG. 5.

It may be understood that in this embodiment of this application, for descriptions of the registration request message, the indication information, the registration type, the disaster scenario, the load status, the threshold (including a first threshold and a second threshold), refer to descriptions in the foregoing method embodiment (as shown in FIG. 2 or FIG. 5), and the details are not described one by one herein.

FIG. 6 is reused. In still some other embodiments of this application, the communication apparatus may be the base station shown above, a chip in the base station, or the like. In other words, the communication apparatus may be configured to perform steps, functions, or the like performed by the base station in the foregoing method embodiments.

For example, the processing unit 601 is configured to determine the maximum waiting duration based on the load status. The transceiver unit is configured to output the system message, where the system message includes the maximum waiting duration.

For example, the processing unit 601 may be further configured to perform step 301 shown in FIG. 3, and the transceiver unit 602 may be further configured to perform the sending step in step 302, the receiving step in step 304, and the like shown in FIG. 3. For another example, the processing unit 601 may be further configured to perform step 501 shown in FIG. 5, and the transceiver unit 602 may be further configured to perform the sending step in step 502 and the like shown in FIG. 5.

It may be understood that in this embodiment of this application, for descriptions of the load status, the maximum waiting duration, the disaster scenario, and the like, refer to descriptions in the foregoing method embodiment (as shown in FIG. 3 or FIG. 5), and the details are not described one by one herein.

It may be understood that specific descriptions of the transceiver unit and the processing unit in the foregoing embodiments are merely examples. For specific functions, steps, or the like performed by the transceiver unit and the processing unit, refer to the foregoing method embodiments, and the details are not described herein.

The transmitter end device and the receiver end device in embodiments of this application are described above, and possible product forms of the transmitter end device and the receiver end device are described below. It should be understood that a product in any form that has the function of the transmitter end device in FIG. 6 or a product in any form that has the function of the receiver end device in FIG. 6 falls within the protection scope of embodiments of this application. It should be further understood that the following description is merely an example, and product forms of the transmitter end device and the receiver end device in embodiments of this application are not limited thereto.

In a possible implementation, in the communication apparatus shown in FIG. 6, the processing unit 601 may be one or more processors, the transceiver unit 602 may be a transceiver, or the transceiver unit 602 may include a sending unit and a receiving unit. The sending unit may be a transmitter, the receiving unit may be a receiver, and the sending unit and the receiving unit are integrated into one device, for example, a transceiver. In this embodiment of this application, the processor and the transceiver may be coupled, or the like. A manner of connection between the processor and the transceiver is not limited in this embodiment of this application.

Figure 7:
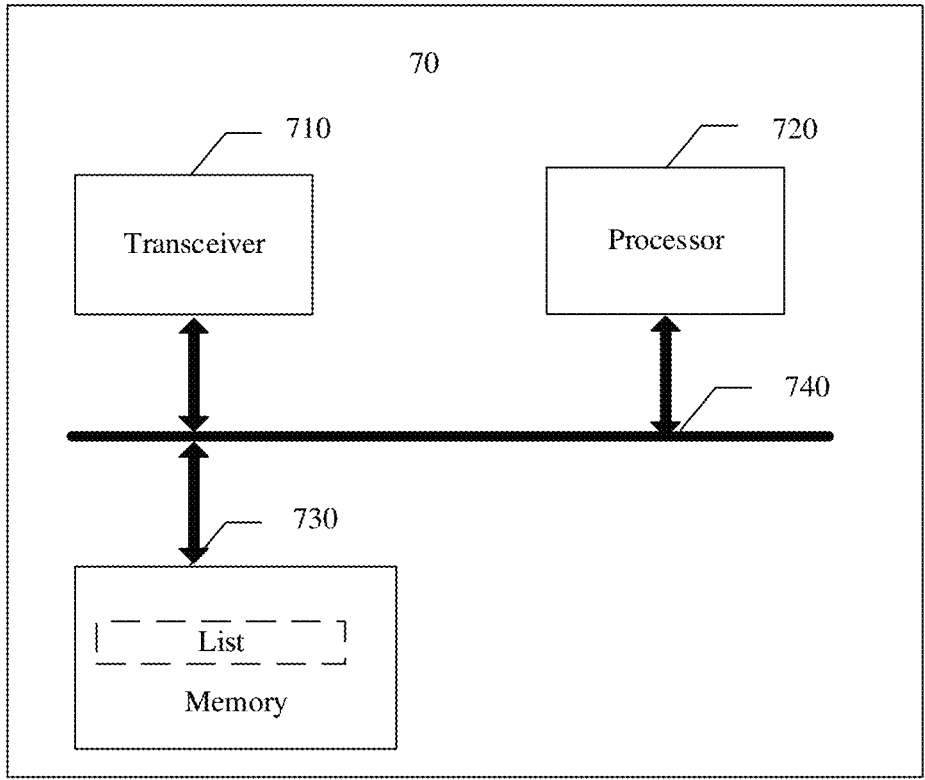

As shown in FIG. 7, a communication apparatus 70 includes one or more processors 720 and a transceiver 710.

For example, when the communication apparatus is configured to perform the step, the method, or the function performed by the terminal device, the transceiver 710 is configured to send the registration request message to the AMF, receive the registration response message from the AMF, and the like. Alternatively, the transceiver 710 is configured to receive the system message from the base station in the roaming network. The processor 720 is configured to determine, based on the identifier of the terminal device and the maximum waiting duration, the waiting duration for sending the registration request message. Alternatively, the processor 720 is configured to determine the list based on the registration reject message, where the list includes a network that is corresponding to the AMF and that is not allowed to be accessed in the disaster scenario.

For example, when the communication apparatus is configured to perform the step, the method, or the function performed by the AMF, the transceiver 710 is configured to receive the registration request message from the terminal device, and send the registration response message (including the registration accept message or the registration reject message) to the terminal device. The processor 720 is configured to determine the registration response message based on the indication information and the load status.

For example, when the communication apparatus is configured to perform the step, the method, or the function performed by the foregoing base station, the processor 720 is configured to determine the maximum waiting duration based on the load status, and the transceiver 710 is configured to send the system message to the terminal device, where the system message includes the maximum waiting duration.

It may be understood that for specific descriptions of the transceiver and the processor, refer to the communication apparatus shown in FIG. 6 or the foregoing method embodiment, and the details are not described herein.

In various implementations of the communication apparatus shown in FIG. 7, the transceiver may include a receiver and a transmitter, the receiver is configured to perform the receiving function (or operation), and the transmitter is configured to perform the transmitting function (or operation). The transceiver is configured to communicate with another device/apparatus through a transmission medium.

Optionally, the communication apparatus 70 may further include one or more memories 730 configured to store a program instruction and/or data (for example, when the communication apparatus is configured to perform the steps performed by the terminal device, the memory may include the list, and therefore, the list shown in FIG. 7 is shown by dashed lines). The memory 730 is coupled to the processor 720. The coupling in this embodiment of this application may be indirect coupling or a communicative connection between apparatuses, units, or modules in an electrical form, a mechanical form, or another form, and is used for information exchange between the apparatuses, the units, or the modules. The processor 720 may cooperate with the memory 730. The processor 720 may execute the program instruction stored in the memory 730. Optionally, at least one of the one or more memories may be included in the processor.

A specific connection medium between the transceiver 710, the processor 720, and the memory 730 is not limited in this embodiment of this application. In this embodiment of this application, in FIG. 7, the memory 730, the processor 720, and the transceiver 710 are connected through a bus 740. The bus is represented by a bold line in FIG. 7. A manner of connection between other components is merely an example for description, and this application is not limited thereto. The bus may be classified into an address bus, a data bus, a control bus, and the like. For ease of representation, only one bold line represents the bus in FIG. 7, but this does not mean that there is only one bus or only one type of bus.

In this embodiment of this application, the processor may be a general-purpose processor, a digital signal processor, an application-specific integrated circuit, a field programmable gate array or another programmable logic device, a discrete gate or transistor logic device, a discrete hardware component, or the like. The processor can implement or execute the methods, the steps, and the logical block diagrams disclosed in embodiments of this application. The general-purpose processor may be a microprocessor, any conventional processor, or the like. The steps of the methods disclosed in combination with embodiments of this application may be directly implemented by a hardware processor, or may be implemented by using a combination of hardware and software modules in the processor, or the like.

In this embodiment of this application, the memory may include but is not limited to a nonvolatile memory such as a hard disk drive (HDD) or a solid-state drive (SSD), a random access memory (RAM), an erasable programmable read-only memory (EPROM), a read-only memory (ROM), or a portable read-only memory (CD-ROM). The memory is any storage medium that can be used to carry or store program code in a form of an instruction or a data structure and that can be read and/or written by a computer (for example, the communication apparatus shown in this application). However, this application is not limited thereto. Alternatively, the memory in this embodiment of this application may be a circuit or any other apparatus that can implement a storage function, and is configured to store a program instruction and/or data.

For example, when the communication apparatus is configured to perform the steps performed by the terminal device, the processor 720 is mainly configured to process a communication protocol and communication data, control the entire communication apparatus, execute a software program, and process data of the software program. The memory 730 is mainly configured to store the software program and the data. The transceiver 710 may include a control circuit and an antenna. The control circuit is mainly configured to convert a baseband signal and a radio frequency signal and process the radio frequency signal. The antenna is mainly configured to receive and send the radio frequency signal in a form of an electromagnetic wave. The input/output apparatus, for example, a touchscreen, a display screen, or a keyboard, is mainly configured to receive data input by a user and output data to the user. After the communication apparatus is powered on, the processor 720 may read the software program in the memory 730, interpret and execute an instruction of the software program, and process data of the software program. When the data needs to be sent in a wireless manner, the processor 720 performs baseband processing on to-be-sent data, and then outputs the baseband signal to a radio frequency circuit. The radio frequency circuit performs radio frequency processing on the baseband signal, and then sends the radio frequency signal in an electromagnetic wave form through the antenna. When the data is sent to the communication apparatus, the radio frequency circuit receives the radio frequency signal through the antenna, converts the radio frequency signal into a baseband signal, and outputs the baseband signal to the processor 720. The processor 720 converts the baseband signal into data and processes the data. In another implementation, the radio frequency circuit and the antenna may be disposed independent of the processor that performs baseband processing. For example, in a distributed scenario, the radio frequency circuit and the antenna may be disposed remotely and independent of the communication apparatus.

It may be understood that the communication apparatus shown in this embodiment of this application may alternatively include more components than those shown in FIG. 7, or the like. This is not limited in this embodiment of this application. The foregoing methods performed by the processor and the transceiver are merely examples. For specific steps performed by the processor and the transceiver, refer to the methods described above.

Figure 8:
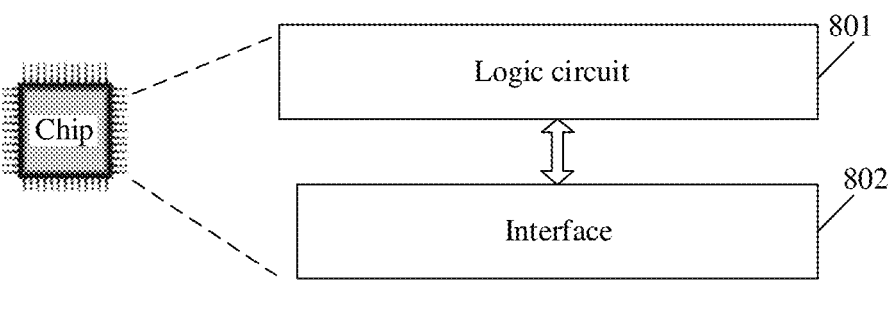

In another possible implementation, in the communication apparatus shown in FIG. 6, the processing unit 601 may be one or more logic circuits, and the transceiver unit 602 may be an input/output interface, or may referred to as a communication interface, an interface circuit, an interface, or the like. Alternatively, the transceiver unit 602 may include a sending unit and a receiving unit. The sending unit may be an output interface, and the receiving unit may be an input interface. The sending unit and the receiving unit are integrated into one unit, for example, an input/output interface. As shown in FIG. 8, the communication apparatus shown in FIG. 8 includes a logic circuit 801 and an interface 802. The processing unit 601 may be implemented through the logic circuit 801, and the transceiver unit 602 may be implemented through the interface 802. The logic circuit 801 may be a chip, a processing circuit, an integrated circuit, a system on chip (system on chip, SoC), or the like. The interface 802 may be a communication interface, an input/ output interface, a pin, or the like. For example, FIG. 8 is an example in which the foregoing communication apparatus is a chip. The chip includes the logic circuit 801 and the interface 802.

In this embodiment of this application, the logic circuit and the interface may be further coupled to each other. A specific manner of connection between the logical circuit and the interface is not limited in this embodiment of this application.

For example, when the communication apparatus is configured to perform the method, the function, or the step performed by the terminal device, for example, the interface 802 is configured to output the registration request message and input the registration response message. For another example, the interface 802 is configured to input the system message, and the logic circuit 801 is configured to determine, based on the identifier of the terminal device and the maximum waiting duration, the waiting duration for sending the registration request message. For another example, the logic circuit 801 is configured to determine the list based on the registration reject message.

For example, when the communication apparatus is configured to perform the method, the function, or the step performed by the AMF, for example, the interface 802 is configured to input the registration request message and output the registration response message. For another example, the logic circuit 801 is configured to determine the registration response message based on the indication information and the load status, and the interface 802 is configured to output the registration response message.

For example, when the communication apparatus is configured to perform the method, the function, or the step performed by the AMF, for example, the logic circuit 801 is configured to determine the maximum waiting duration based on the load status, and the interface 802 is configured to output the system message.

It may be understood that for specific descriptions of the interface and the logic circuit, refer to the foregoing embodiments, and the details are not described one by one herein.

It may be understood that the communication apparatus shown in this embodiment of this application may implement the method provided in embodiments of this application in a form of hardware, or may implement the method provided in embodiments of this application in a form of software. This is not limited in embodiments of this application.

For specific implementations of the embodiments shown in FIG. 8, refer to the foregoing embodiments, and the details are not described herein.

An embodiment of this application further provides a wireless communication system. The wireless communication system includes a terminal device and an AMF. The terminal device and the AMF may be configured to perform the method in any one of the foregoing embodiments. Optionally, the wireless communication system further includes a base station, and the base station may be configured to perform the method in any one of the foregoing embodiments. For specific descriptions of the terminal device, the AMF, and the base station, refer to the foregoing embodiments, and the details are not described herein.

In addition, this application further provides a computer program. The computer program is used to implement the operation and/or the processing performed by the terminal device in the method provided in this application.

This application further provides a computer program. The computer program is used to implement the operation and/or the processing performed by the AMF in the method provided in this application.

This application further provides a computer program. The computer program is used to implement the operation and/or the processing performed by the base station (for example, a base station in a roaming network of the UE) in the method provided in this application.

This application further provides a computer-readable storage medium. The computer-readable storage medium stores computer code. When the computer code is run on a computer, the computer is enabled to perform the operation and/or the processing performed by the terminal device in the method provided in this application.

This application further provides a computer-readable storage medium. The computer-readable storage medium stores computer code. When the computer code is run on a computer, the computer is enabled to perform the operation and/or the processing performed by the AMF in the method provided in this application.

This application further provides a computer-readable storage medium. The computer-readable storage medium stores computer code. When the computer code is run on a computer, the computer is enabled to perform the operation and/or the processing performed by the base station (for example, the base station in the roaming network of the UE) in the method provided in this application.

This application further provides a computer program product. The computer program product includes computer code or a computer program. When the computer code or the computer program is run on a computer, the operation and/or the processing performed by the terminal device in the method provided in this application is performed.

This application further provides a computer program product. The computer program product includes computer code or a computer program. When the computer code or the computer program is run on a computer, the operation and/or the processing performed by the AMF in the method provided in this application is performed.

This application further provides a computer program product. The computer program product includes computer code or a computer program. When the computer code or the computer program is run on a computer, the operation and/or the processing performed by the base station (for example, the base station in the roaming network of the UE) in the method provided in this application is performed.

In the plurality of embodiments provided in this application, it should be understood that the disclosed system, apparatus, and method may be implemented in another manner. For example, the described apparatus embodiment is merely an example. For example, division into the units is merely logical function division and may be other division in actual implementation. For example, a plurality of units or components may be combined or integrated into another system, or some features may be ignored or not performed. In addition, the mutual coupling or direct coupling or communicative connection shown or discussed may be indirect coupling or communicative connection through some interfaces, apparatuses, or units, or may be electrical, mechanical, or other forms of connection.

The units described as separate components may or may not be physically separate, and components displayed as units may or may not be physical units, and may be at one position, or may be distributed on a plurality of network units. Some or all of the units may be selected based on an actual requirement to implement the technical effects of the solutions provided in embodiments of this application.

In addition, functional units in embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of the software function unit and sold or used as an independent product, the integrated unit may be stored in a computer-readable storage medium. Based on such an understanding, the technical solutions of this application essentially, or the part contributing to the conventional technologies, or all or some of the technical solutions may be implemented in a form of a software product. The software product is stored in a storage medium and includes a plurality of instructions for instructing a computer device (which may be a personal computer, a server, or a network device) to perform all or some of the steps of the methods described in embodiments of this application. The readable storage medium includes any medium that can store program code, such as a USB flash drive, a removable hard disk, a read-only memory (ROM), a random access memory (RAM), a magnetic disk, or an optical disc.

The foregoing descriptions are merely the specific implementations of this application, and are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:
sending, by a terminal device, a registration request message to an access and mobility management network element, wherein the registration request message comprises an N bit indication information, and the indication information indicates whether a disaster scenario corresponding to the terminal device exists, and N is 1 or 2; and receiving, by the terminal device, a registration response message from the access and mobility management network element; and
wherein:
when the N bits of the indication information are a first value, the indication information indicates that the disaster scenario corresponding to the terminal device exists; and
when the N bits of the indication information are a second value, the indication information indicates that the disaster scenario corresponding to the terminal device does not exist.

2. The method according to claim 1, wherein the registration request message further comprises a registration type, and the registration type comprises any one of an initial registration type, a mobility registration type, a periodic registration type, or an emergency registration type.

3. The method according to claim 2, wherein the registration type is carried in a three bit field in the registration request message, and different values of the three bits indicate different registration types of the registration request message.

4. The method according to claim 2, wherein the terminal device learns of the disaster scenario based on a broadcast message of a base station.

5. A method, comprising:
receiving, by an access and mobility management network element, a registration request message from a terminal device, wherein the registration request message comprises an N bit indication information, and the N bit indication information indicates whether a disaster scenario corresponding to the terminal device exists, and N is 1 or 2; and
sending, by the access and mobility management network element, a registration response message to the terminal device based on the indication information and a load status; and
wherein:
when the N bits of the indication information are a first value, the indication information indicates that the disaster scenario corresponding to the terminal device exists; and
when the N bits of the indication information are a second value, the indication information indicates that the disaster scenario corresponding to the terminal device does not exist.

6. The method according to claim 5, wherein sending, by the access and mobility management network element, the registration response message to the terminal device based on the indication information and the load status comprises:
determining, by the access and mobility management network element, a threshold based on the indication information; and
sending, by the access and mobility management network element, a registration accept message or a registration reject message to the terminal device based on the load status and the threshold.

7. An apparatus, comprising:
a processor, configured to:
send a registration request message to an access and mobility management network element, wherein the registration request message comprises an N bit indication information, and the N bit indication information indicates whether a disaster scenario corresponding to the apparatus exists, and N is 1 or 2; and receive a registration response message from the access and mobility management network element; and wherein:

when the N bits of the indication information is a first value, the indication information indicates that the disaster scenario corresponding to a terminal device exists; and when the N bits of the indication information is a second value, the indication information indicates that the disaster scenario corresponding to the terminal device does not exist.

8. The apparatus according to claim 7, wherein the registration request message further comprises a registration type, and the registration type comprises an initial registration type.

9. The apparatus according to claim 8, wherein the registration type is carried in a three bit field in the registration request message, and different values of the three bits indicate different registration types of the registration request message.

10. The apparatus according to claim 8, wherein the registration request message further carries a registration request message identifier.

11. The apparatus according to claim 7, wherein the registration request message further comprises a registration type, and the registration type comprises a mobility registration type.

12. The apparatus according to claim 7, wherein the registration request message further comprises a registration type, and the registration type comprises a periodic registration type.

13. The apparatus according to claim 7, wherein the registration request message further comprises a registration type, and the registration type comprises an emergency registration type.

14. An apparatus, comprising:

a transceiver, configured to receive a registration request message from a terminal device, wherein the registration request message comprises an N bit indication information, and the N bit indication information indicates whether a disaster scenario corresponding to the terminal device exists, and N is 1 or 2; and a processor, configured to send a registration response message to the terminal device based on the indication information and a load status through the transceiver; and wherein:

when the N bits of the indication information is a first value, the indication information indicates that the disaster scenario corresponding to the terminal device exists; and when the N bits of the indication information is a second value, the indication information indicates that the disaster scenario corresponding to the terminal device does not exist.

15. The apparatus according to claim 14, wherein the processor is configured to:

determine a threshold based on the N bit indication information; and send a registration accept message or a registration reject message to the terminal device based on the load status and the threshold through the transceiver.

16. The apparatus according to claim 15, wherein:

when the N bit indication information indicates that the disaster scenario corresponding to the terminal device exists, the threshold is a first threshold.

17. The apparatus according to claim 16, wherein:

when the N bit indication information indicates that the disaster scenario corresponding to the terminal device does not exist, the threshold is a second threshold.

18. The apparatus according to claim 14, wherein the registration request message further comprises a registration type, and the registration type comprises any one of an initial registration type, a mobility registration type, a periodic registration type, or an emergency registration type.

19. The apparatus according to claim 18, wherein the registration type is carried in a three bit field in the registration request message, and different values of the three bits indicate different registration types of the registration request message.

20. The apparatus according to claim 18, wherein the registration request message further carries a registration request message identifier.

* * * * *